US012608617B2

(12) United States Patent (10) Patent No.: US 12,608,617 B2

Ikeda et al. (45) Date of Patent: Apr. 21, 2026

(54) MODEL TRAINING APPARATUS, MODEL TRAINING METHOD, AND PROGRAM FOR RETRAINING ANOMALY DETECTION MODEL

(71) Applicant: NTT, Inc., Tokyo (JP)

(72) Inventors: Yasuhiro Ikeda, Musashino (JP);
Keisuke Ishibashi, Musashino (JP);
Yusuke Nakano, Musashino (JP);
Keishiro Watanabe, Musashino (JP);
Ryoichi Kawahara, Musashino (JP)

(73) Assignee: NTT, Inc., Tokyo (JP)

( * ) Notice: Subject to any disclaimer, the term of this patent is extended or adjusted under 35 U.S.C. 154(b) by 981 days.

(21) Appl. No.: 16/960,448

(22) PCT Filed: Oct. 26, 2018

(86) PCT No.: PCT/JP2018/039953
§ 371 (c)(1),
(2) Date: Jul. 7, 2020

(87) PCT Pub. No.: WO2019/138655

PCT Pub. Date: Jul. 18, 2019

(65) Prior Publication Data

US 2020/0334578 A1 Oct. 22, 2020

(30) Foreign Application Priority Data

Jan. 9, 2018 (JP) ................................. 2018-001485

(51) Int. Cl.
*G06N 3/088* (2023.01)
*G06F 18/21* (2023.01)
(Continued)

(52) U.S. Cl.
CPC ........... *G06N 3/088* (2013.01); *G06F 18/214* (2023.01); *G06F 18/217* (2023.01); *G06F 18/22* (2023.01); *G06N 20/00* (2019.01)

(58) Field of Classification Search
CPC ........ G06N 3/088; G06N 20/00; G06N 3/045; G06F 18/214; G06F 18/217; G06F 18/22; G06F 11/07
See application file for complete search history.

(56) References Cited

U.S. PATENT DOCUMENTS

| | | | | |
|---|---|---|---|---|
| 7,058,616 B1* | 6/2006 | Larder | ................... | G16B 20/20 |
| | | | | 435/5 |
| 2014/0114442 A1* | 4/2014 | Li | ....................... | G06F 11/0736 |
| | | | | 700/47 |

(Continued)

FOREIGN PATENT DOCUMENTS

JP 2001-236337 A 8/2001

OTHER PUBLICATIONS

O'Reilly et al. ("Anomaly Detection in Wireless Sensor Networks in a Non-Stationary Environment", IEEE, vol. 16, No. 3, 2014) (Year: 2014).*

(Continued)

*Primary Examiner* — Imad Kassim

(74) *Attorney, Agent, or Firm* — Oblon, McClelland, Maier & Neustadt, L.L.P.

(57) ABSTRACT

An apparatus for training a model includes a storage unit configured to store a parameter of the model trained by using a training data set, and the training data set, a detector configured to use the model to determine whether an anomaly is present in a test data set and store a determined result and the test data set in the storage unit, and a retraining unit configured to retrain the model by using the determined result, the test data set, and the training data set.

9 Claims, 9 Drawing Sheets

(51) Int. Cl.
    *G06F 18/214*     (2023.01)
    *G06F 18/22*     (2023.01)
    *G06N 20/00*     (2019.01)

(56)           References Cited

U.S. PATENT DOCUMENTS

2017/0353477 A1\*   12/2017   Faigon ................ G06F 21/6209
2019/0391038 A1\*   12/2019   Kitai ....................... G05B 23/02
2020/0052981 A1\*   2/2020   Pandey ................. H04L 41/142

OTHER PUBLICATIONS

Liu et al. ("An Anomaly Detection Algorithm of Cloud Platform Based on Self-Organizing Maps", 2016) (Year: 2016).\*
Kirkpatrick et al. ("Overcoming catastrophic forgetting in neural networks", PNAS, Mar. 28, 2017, vol. 114, No. 13, pp. 3521-3526) (Year: 2017).\*
Tune et al. ("Fisher Information in Flow Size Distribution Estimation", 2011) (Year: 2011).\*
Rassam et al. ("Adaptive and online data anomaly detection for wireless sensor systems", Knowledge-Based Systems 60 (2014) 44-57) (Year: 2014).\*
Dongli et al. ("A method of anomaly detection and fault diagnosis with online adaptive learning under small training samples", Pattern Recognition vol. 64, Apr. 2017, pp. 374-385) (Year: 2017).\*
Neuberg et al. ("Detecting Relative Anomaly", arXiv May 16, 2016) (Year: 2016).\*
Tian et al. ("A Hierarchical PCA-based Anomaly Detection Model", 2013 pp. 621-625) (Year: 2013).\*
Burbeck et al. ("ADWICE—Anomaly Detection with Real-Time Incremental Clustering", ICISC 2004, LNCS 3506, pp. 407-424, 2005) (Year: 2005).\*
International Search Report issued on Jan. 29, 2019 in PCT/JP2018/039953 filed on Oct. 26, 2018, 2 pages.
Nakano et al., "Autoencoder based detection method for network anomalies", Proceedings of The 2017 IEICE General Conference, Communication 2, 2017, ISSN 1349-1369, 6 total pages (with unedited computer-generated English translation).
Sato et al., "Learning Weights of Training Data by Game Results", Journal of Information Processing Society, 2014, vol. 55, No. 11, ISSN 1882-7764, 17 total pages (with English Abstract and unedited computer-generated English translation).
Ueda et al., "Automated Training Data Selection for Response Time Degradation Diagnosis of Web Service Systems Using Machine Learning Combination", The Transactions of the Institute of Electronics, Information and Communication D, 2016, vol. J99-D, No. 1, ISSN 1881-0225, 11 total pages (with partial English translation).
Sakurada et al., "Dimensionality Reduction with the Autoencoder for Anomaly Detection of Spacecrafts", The 28th Annual Conference of the Japanese Society for Artificial Intelligence, 2014, NTTH266126, 2F3-2, Internet <URL:https://kaigi.org/jsai/webprogram/2014/pdf/94.pdf>, pp. 1-3 (with English Abstract).
Hodge et al., "A Survey of Outlier Detection Methodologies", Artificial Intelligence Review, 2004, <URL:https://www.researchgate/net/publication/220638052>, pp. 1-43 (44 total pages).
Ringberg et al., "Sensitivity of PCA for Traffic Anomaly Detection", ACM SIGMETRICS Performance Evaluation Review 35.1, 2007, pp. 109-120.
Kirkpatrick et al., "Overcoming catastrophic forgetting in neural networks", Proceedings of the National Academy of Sciences, 2017, pp. 1-13.
Bottou, "Large-Scale Machine Learning with Stochastic Gradient Descent", Proceedings of COMPSTAT 2010, Physica-Verlag HD, 2010, pp. 1-10.
Van Der Maaten et al., "Visualizing Data using t-SNE", Journal of Machine Learning Research, 2008, vol. 9, pp. 2579-2605.
Tavallaee et al., "A Detailed Analysis of the KDD CUP 99 Data Set", Computational Intelligence for Security and Defense Applications, 2009, CISDA 2009, IEEE Symposium on. IEEE, NRC Publications Archive (NPArC), 8 total pages.
Yasuhiro Ikeda, et al., "Inferring causal parameters of anomalies detected by autoencoder using sparse optimization," The Institute of Electronics, Information and Communication Engineers, Technical Report of IEICE, 2017 (with English Abstract), pp. 1-6.
Constantine Manikopoulos, et al., "Network Intrusion and Fault Detection: A Statistical Anomaly Approach," IEEE Communications Magazine, Oct. 2002, pp. 76-82.
Office Action issued Nov. 24, 2021 in corresponding Japanese Patent Application No. 2019-564307 (with English Translation), 8 pages.
"Read a paper developed by DeepMind an algorithm to avoid the flaws "catastrophic oblivion" of neural networks", 2017, 20 pages (with English Translation) Retrieved from the Internet:<URL:https://qiita.com/yu4u/items/8b1e41fc04460b89cac2>.

\* cited by examiner

FIG.3

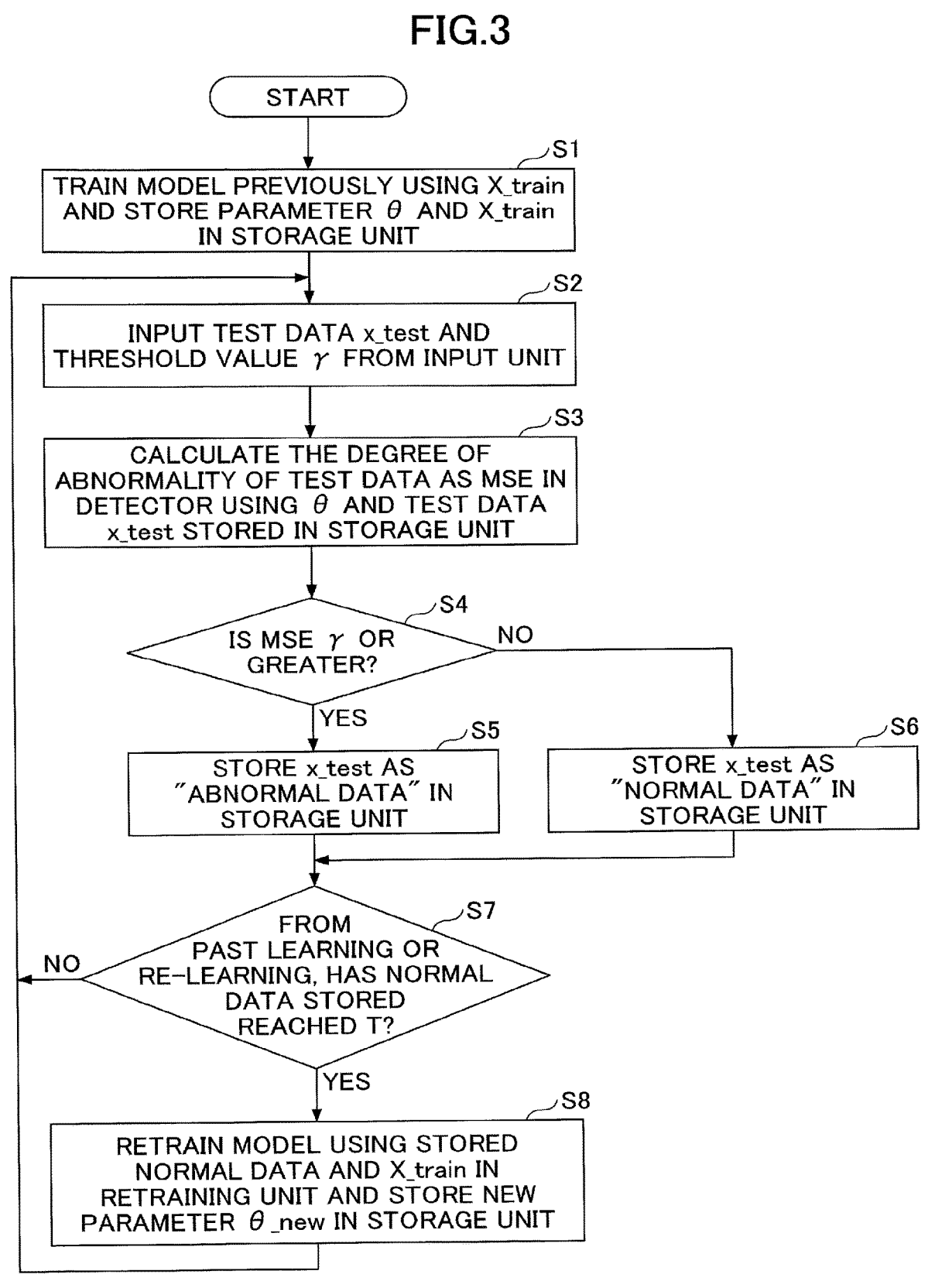

```
                    ┌─────────────┐
                    │    START    │
                    └─────────────┘
                           │
                           ▼                              S1
┌──────────────────────────────────────────────────────┐
│  TRAIN MODEL PREVIOUSLY USING X_train                  │
│  AND STORE PARAMETER θ AND X_train                     │
│  IN STORAGE UNIT                                       │
└──────────────────────────────────────────────────────┘
                           │
                           ▼                              S2
┌──────────────────────────────────────────────────────┐
│        INPUT TEST DATA x_test AND                      │
│  THRESHOLD VALUE γ FROM INPUT UNIT                     │
└──────────────────────────────────────────────────────┘
                           │
                           ▼                              S3
┌──────────────────────────────────────────────────────┐
│       CALCULATE THE DEGREE OF                          │
│  ABNORMALITY OF TEST DATA AS MSE IN                    │
│  DETECTOR USING θ AND TEST DATA                        │
│  x_test STORED IN STORAGE UNIT                         │
└──────────────────────────────────────────────────────┘
                           │
                           ▼                 S4
                      ◇───────────◇         NO
                     ◇  IS MSE γ OR ◇──────────────┐
                      ◇  GREATER? ◇                │
                        ◇───────◇                  │
                           │ YES                   │
                           ▼          S5           ▼              S6
        ┌────────────────────────┐   ┌────────────────────────┐
        │   STORE x_test AS       │   │    STORE x_test AS      │
        │  "ABNORMAL DATA" IN     │   │  "NORMAL DATA" IN       │
        │   STORAGE UNIT          │   │   STORAGE UNIT          │
        └────────────────────────┘   └────────────────────────┘
                           │                       │
                           ▼◄──────────────────────┘
                      ◇───────────◇     S7
              NO     ◇    FROM      ◇
         ◄─────────◇ PAST LEARNING OR◇
                   ◇ RE-LEARNING, HAS NORMAL◇
                    ◇ DATA STORED ◇
                      ◇ REACHED T? ◇
                        ◇───────◇
                           │ YES
                           ▼              S8
┌──────────────────────────────────────────────────────┐
│    RETRAIN MODEL USING STORED                          │
│    NORMAL DATA AND X_train IN                          │
│    RETRAINING UNIT AND STORE NEW                       │
│    PARAMETER θ_new IN STORAGE UNIT                     │
└──────────────────────────────────────────────────────┘
```

FIG.6

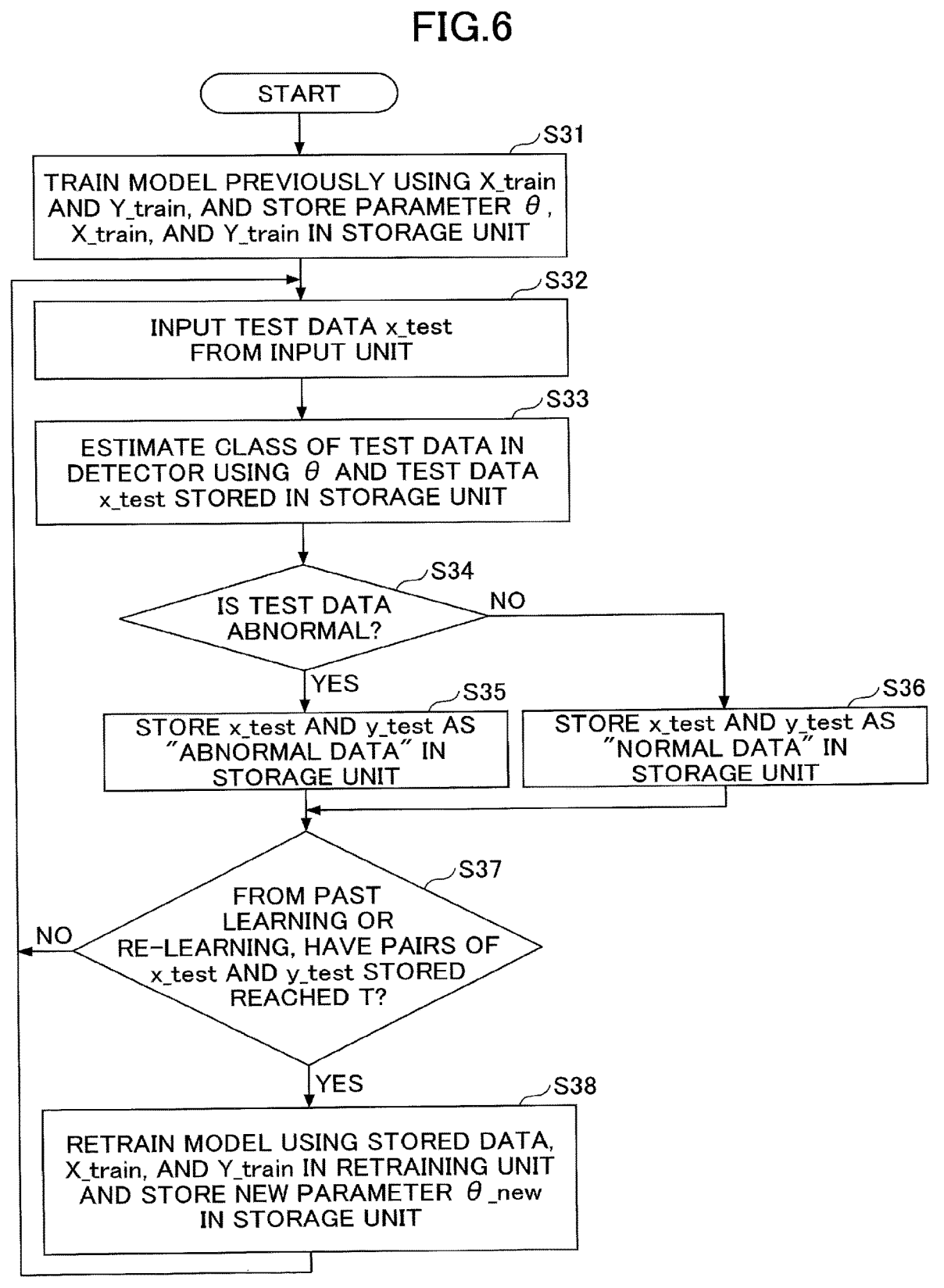

START

/S31

TRAIN MODEL PREVIOUSLY USING X_train
AND Y_train, AND STORE PARAMETER $\theta$,
X_train, AND Y_train IN STORAGE UNIT

/S32

INPUT TEST DATA x_test
FROM INPUT UNIT

/S33

ESTIMATE CLASS OF TEST DATA IN
DETECTOR USING $\theta$ AND TEST DATA
x_test STORED IN STORAGE UNIT

/S34

IS TEST DATA
ABNORMAL?          NO

YES

/S35

STORE x_test AND y_test AS
"ABNORMAL DATA" IN
STORAGE UNIT

/S36

STORE x_test AND y_test AS
"NORMAL DATA" IN
STORAGE UNIT

/S37

FROM PAST
LEARNING OR
RE-LEARNING, HAVE PAIRS OF
x_test AND y_test STORED
REACHED T?          NO

YES

/S38

RETRAIN MODEL USING STORED DATA,
X_train, AND Y_train IN RETRAINING UNIT
AND STORE NEW PARAMETER $\theta$_new
IN STORAGE UNIT

FIG.8
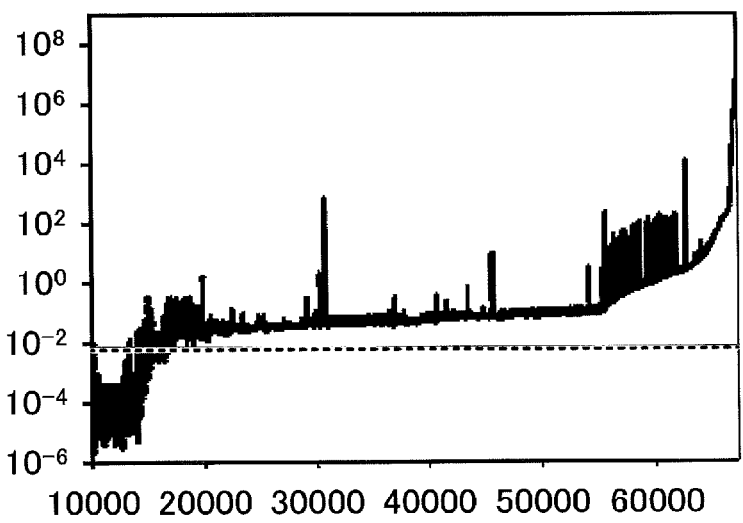
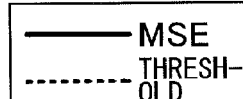
FIG.9
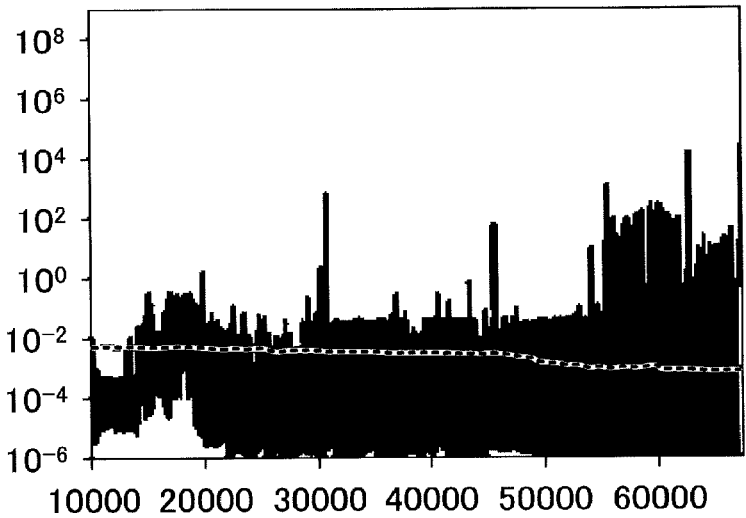

| MODEL | NO RE-LEARNING | TREND RE-LEARNING | TREND AND OVER-DETECTION RE-LEARNING |
|---|---|---|---|
| THE NUMBER OF OVER-DETECTIONS (IN 57344 DATA) | 52471 | 7270 | 264 |

MODEL TRAINING APPARATUS, MODEL TRAINING METHOD, AND PROGRAM FOR RETRAINING ANOMALY DETECTION MODEL

TECHNICAL FIELD

The present invention relates to a technique for monitoring data collected from a system in real time and continuously performing anomaly detection using a detector based on a learning model.

BACKGROUND ART

Real-time anomaly detection periodically observes various data and determines whether the observed data is normal or abnormal based on a previously learned result. As an anomaly detection algorithm that uses "learning period" data defined as a normal state in advance, as training data for training, and compares an observed test data trend with a learned training data trend in a "test period" in which the anomaly detection is performed, an algorithm that learns a correlation of various data in a normal state and determines an "anomaly" when the correlation between learned data does not hold in the test period, is proposed (Non Patent Documents 1 to 3). Such an algorithm can perform the anomaly detection by using only data in a normal state without using data in an abnormal state that is difficult to be labelled.

RELATED ART DOCUMENTS

Non-Patent Documents

Non-Patent Document 1: Hodge, Victoria J. and Jim Austin. "A survey of outlier detection methodologies.", Artificial intelligence review 22.2 (2004), pp. 85-126.
Non-Patent Document 2: Mayu Sakurada and Takehisa Yairi, "Dimensionality Reduction with the Autoencoder for Anomaly Detection of Spacecrafts", Proceedings of the Annual Conference of Japanese Society for Artificial Intelligence 28, 1-3, 2014
Non-Patent Document 3: Ringberg, Haakon, et al., "Sensitivity of PCA for traffic anomaly detection.", ACM SIGMETRICS Performance Evaluation Review, 35.1, 2007, pp. 109-120.

SUMMARY OF INVENTION

Problem to be Solved by the Invention

When such a detection algorithm is continuously used for the anomaly detection, there is a problem that when a change occurs in a trend in data to be observed, the change in the trend may be detected as an anomaly.

For example, when the data is data such as traffic amount, the traffic amount tends to increase in an overall network, input data to the anomaly detection algorithm gradually increases, and a simple increase in the traffic amount may be detected as an anomaly. Additionally, there is a problem to be solved that when over-detection that determines normal data as the anomaly and non-detection that overlooks abnormal data as normal data, occur, similar over-detection and non-detection repeatedly occur.

That is, in the related art, there has been a problem to be solved that when an anomaly detection algorithm using a trained model is continuously used, anomaly detection is not appropriately performed.

The present disclosure is made in view of the description above, and aims to provide a technique that can appropriately perform anomaly detection when an anomaly detection algorithm using a trained model is continuously used.

Means for Solving the Problem

According to a disclosed technique, an apparatus for training a model including a storage unit configured to store a parameter of the model trained by using a training data set, and the training data set, a detector configured to use the model to determine whether an anomaly is present in a test data set and store a determined result and the test data set in the storage device, and a retraining unit configured to retrain the model by using the determined result, the test data set, and the training data set, is provided.

Advantage of the Invention

According to a disclosed technique, a technique that can appropriately perform anomaly detection when an anomaly detection algorithm using a trained model is continuously used, is provided.

BRIEF DESCRIPTION OF DRAWINGS

FIG. 3 is a flowchart for describing an operation of the model training apparatus 100 in a fourth embodiment;

FIG. 6 is a flowchart for describing an operation of the model training apparatus 100 in a seventh embodiment;

FIG. 8 is a graph indicating a change in the degree of the anomaly when a technique of the present invention is not used;

FIG. 9 is a graph indicating a change in the degree of the anomaly when a trend is tracked using the fourth embodiment;

EMBODIMENTS OF THE INVENTION

In the following, embodiments of the present invention (i.e., present embodiments) will be described with reference to the drawings. The embodiments described below are only examples, and an embodiment to which the present invention is applied is not limited to the following embodiments. (System Configuration)

Figure 1:
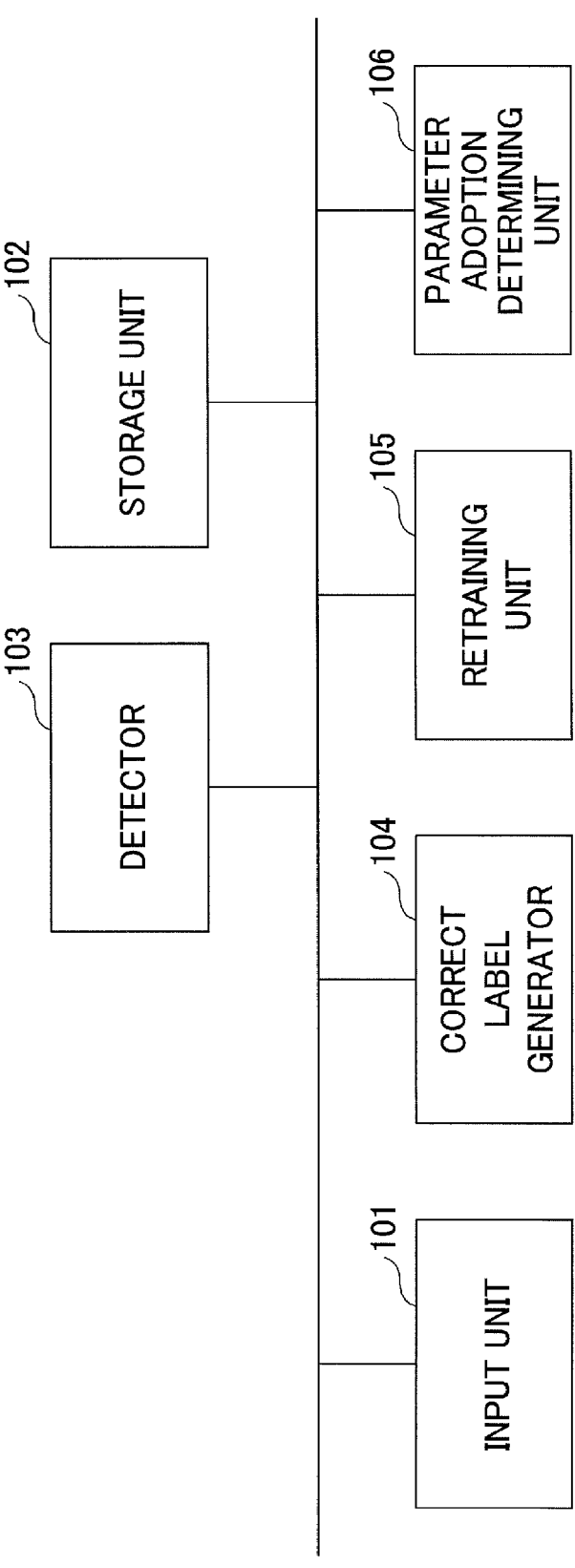
FIG. 1 is a configuration diagram of a model training apparatus 100 according to an embodiment of the present invention.

FIG. 1 illustrates a configuration example of a model training apparatus 100 according to an embodiment of the present invention. As illustrated in FIG. 1, the model training apparatus 100 according to the present embodiment includes an input unit 101, a storage unit 102, a detector 103, a correct label generator 104, a retraining unit 105, and a parameter adoption determining unit 106. A function for training a model first (which will be hereinafter referred to as the training unit) may be given by the model training apparatus 100 or may be provided outside the model training apparatus 100. In the embodiment, it is assumed that the training unit is provided outside the model training apparatus 100.

The input unit 101 inputs external information, such as data to be monitored, an anomaly detection model, and various parameters, to the model training apparatus 100.

The storage unit 102 stores data, a model, and a parameter input from the input unit 101 and a model and a parameter newly calculated by the retraining unit 105.

The detector 103 determines whether the anomaly is present in the data by using the data, the model, and the parameter that are input from the input unit 101 or read from the storage unit 102.

The correct label generator 104 verifies normality of each data that has been input in the past and generates a correct label indicating whether the data is normal. A method of verifying normality is not limited to a specific method. For example, the correct label generator 104 may display the data, a system operator may visually verify normality, and may input a verified result to the correct label generator 104, thereby generating the correct label.

The retraining unit 105 retrains the model with a predetermined method and timing by using the data, the model, and the parameter stored in the storage unit 102.

The parameter adoption determining unit 106 determines whether a model newly generated by the retraining unit 105 is to be used for further anomaly detection.

Details of an operation related to each of the above-described functional units will be described later.

(Hardware Configuration Example)

The model training apparatus 100 described above can be achieved, for example, by causing a computer to execute a program describing processing contents described in the embodiment.

That is, the model training apparatus 100 can be achieved by executing a program corresponding to a process performed by the model training apparatus 100 using a hardware resource such as a CPU and a memory that are embedded in the computer. The program described above can be recorded on a computer-readable recording medium (e.g., portable memory, etc.), and the program can be stored or can be distributed. It is also possible to provide the program through a network, such as the Internet or an e-mail.

Figure 2:
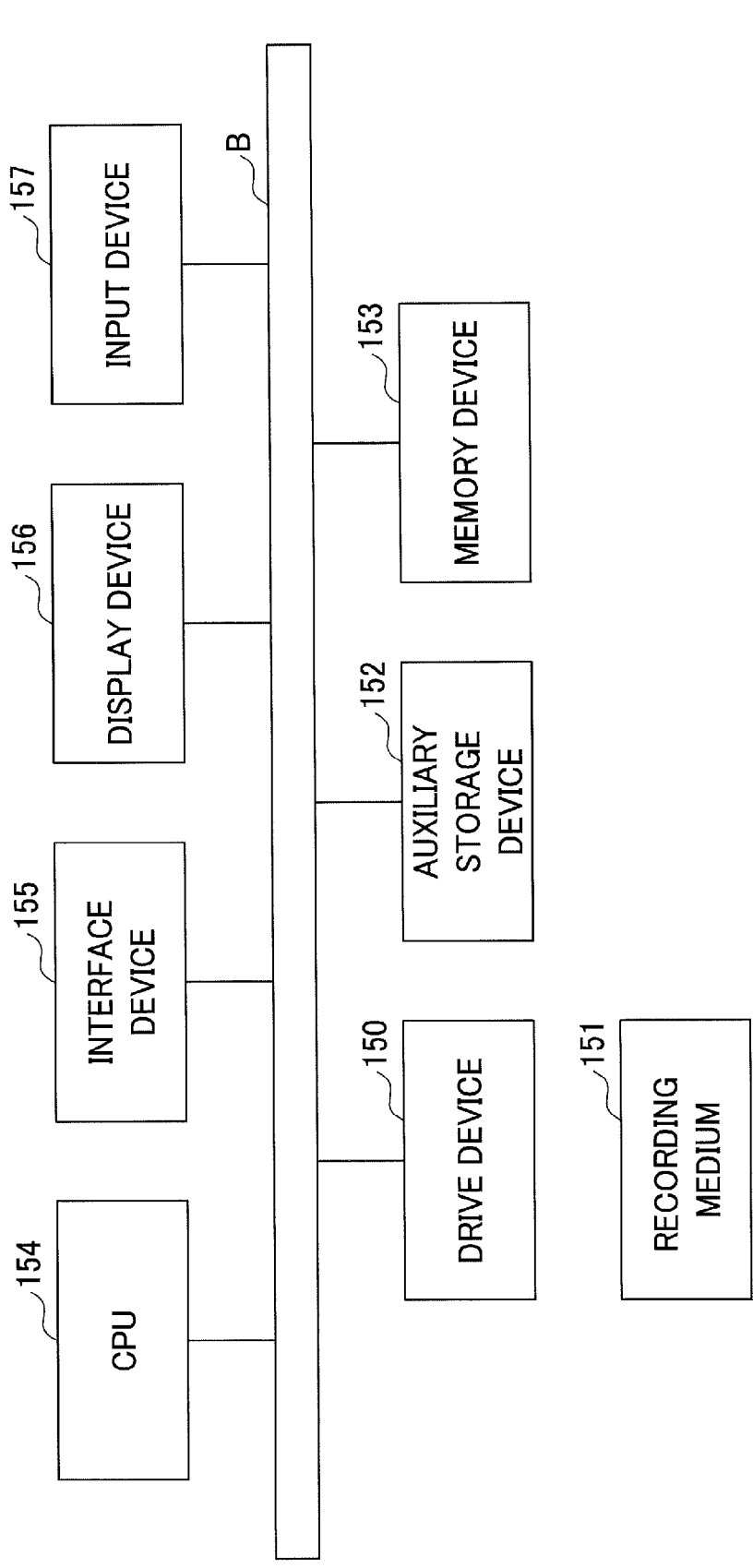
FIG. 2 is a drawing illustrating an example of a hardware configuration of the model training apparatus 100.

FIG. 2 is a drawing illustrating an example of a hardware configuration of the computer described above in the present embodiment. The computer of FIG. 2 includes a drive device 150, an auxiliary storage device 152, a memory device 153, a CPU 154, an interface device 155, a display device 156, an input device 157, and so on, which are interconnected by a bus B.

A program for implementing the process of the computer is provided, for example, by a recording medium 151, such as a CD-ROM or a memory card. When the recording medium 151 storing the program is set in the drive device 150, the program is installed in the auxiliary storage device 152 from the recording medium 151 through the drive device 150. However, an installation of the program is not necessarily performed by the recording medium 151, and the program may be downloaded from another computer through a network. The auxiliary storage device 152 stores the installed program and also stores necessary files, data, and so on.

The memory device 153 reads the program from the auxiliary storage device 152 and stores the program in response to an instruction to start the program. The CPU 154 achieves a function related to the model training apparatus 100 in accordance with the program stored in the memory device 153. The interface device 155 is used as an interface for connecting to a network. The display device 156 displays a Graphical User Interface (GUI) or the like implemented by the program. The input device 157 includes a keyboard and a mouse, a button, a touch panel, and the like, and is used to input various operating instructions. The display device 156 may not be provided.

Embodiments

Next, examples of an operation of the model training apparatus 100 will be described below in a first embodiment to an eleventh embodiment. In the following, the first embodiment and the second embodiment indicate an overview of the operation, and the third embodiment and later describe detailed examples of the operation.

First Embodiment

In the first embodiment, the model training apparatus 100 uses an unsupervised anomaly detection algorithm. On the basis of the unsupervised anomaly detection algorithm, the detector 103 of the model training apparatus 100 uses a model trained by using normal data set X_train={x_train_1, x_train_2, . . . , x_train_T} in a test period, inputs test data x_test to the model, and outputs the degree of the anomaly of the data. The model training apparatus 100 stores past test data in the storage unit 102 and retrains the model in the retraining unit 105 using the stored test data and the training data, so that the model is updated to track a temporal trend of the data and to prevent repeating wrong detection. Specific processing examples will be described in the fourth embodiment, the fifth embodiment, and the sixth embodiment.

Second Embodiment

In the second embodiment, the model training apparatus 100 uses a supervised anomaly detection algorithm. On the basis of the supervised anomaly detection algorithm, the detector 103 of the model training apparatus 100 classifies the test data set into classes using, in a test period, a model retrained by using X_train={x_train_1, x_train_2, . . . , x_train_T} and label data Y_train={y_train_1, y_train_2, . . . , y_train_T} including a label of a class to which each element of X_train belongs, as the training data set, and determines whether the anomaly is present based on a result of classification. At that time, the model training apparatus 100 stores past test data in the storage unit 102 and retrains the model using the stored test data and the training data set in the retraining unit 105, so that the model is updated to track a temporal trend of the data and to prevent repeating wrong detection. Specific processing examples will be described in the seventh embodiment and the eighth embodiment.

Third Embodiment

In the third embodiment, when the retraining unit 105 performs retraining in the first embodiment, the retraining unit 105 performs training in consideration of the importance of the parameters learned in the past, so that the retraining unit 105 re-learns a new data trend while maintaining a trend of data learned in the past.

In the third embodiment, when the training unit trains a model, the degree of importance indicating how important in the training a parameter obtained as a result of the training is, is calculated, and the degree of importance is stored in the storage unit 102. As described above, the training unit is a functional unit outside the model training apparatus 100. However, a configuration in which the training unit is provided in the model training apparatus 100 may be adopted.

Here, with respect to a method of calculating the degree of importance, an example in which the amount of the Fisher information is considered as the importance of parameters, is described. The Fisher information is the amount of information about parameters of data X given as a random variable when a model is considered as a probability model (See "MLA Kirkpatrick, James, et al. "Overcoming catastrophic forgetting in neural networks." Proceedings of the National Academy of Sciences (2017): 201611835").

The training unit calculates the Fisher information of each parameter after learning a parameter $\theta$, and stores the Fisher information as F in the storage unit 102. When the retraining is performed, the retraining unit 105 performs training using the Fisher information F stored in the storage unit 102 such that a parameter having a large amount of the Fisher information is not significantly changed. As such a method, for example, there is a method adding a value obtained by multiplying a square error of the parameter $\theta^{*}\_i$ learned in the past by the Fisher information $F\_i$ for each parameter, to a function that should be minimized in the training, as a penalty term.

For example, when an autoencoder (Non-Patent Document 2) is used as the anomaly detection algorithm, the function that should be minimized in the training is given as a mean square error $L(x)=(1/N)\Sigma\_i=1\^N (x\_i-x'\_i)\^2$ of an input layer x_1, x_2, . . . , x_N and an output layer x'_1, x'_2, . . . , x'_N, but for the retraining using the Fisher information, the following is given as a minimization problem.

$$Min\_\theta E(x,\theta)=L(x)+(\lambda/2)^*\Sigma\_i=1\^I F\_i-\theta^*\_i)\^2$$

Here, x is training data used for the retraining, I is the number of all parameters, and $\lambda$ is a coefficient for the penalty term. The larger the $\lambda$ is, the more strongly the penalty term influences, and the smaller a change in parameter due to the retraining becomes. For training data used for the retraining, both past training data and the test data monitored in the past may be used. However, since information about training performed using the past training data is summarized in the F as the importance of each parameter, only the test data monitored in the past may be used for the retraining. When a new parameter $\theta\_new$ is obtained by the retraining, the retraining unit 105 calculates the Fisher information of the new parameter with the training data x used in the retraining and stores the Fisher information in the storage unit 102.

Fourth Embodiment

In the fourth embodiment, when the retraining unit 105 performs the retraining in the first embodiment or the third embodiment, the retraining unit 105 performs the retraining using test data that was determined to be normal in the past, thereby performing anomaly detection that tracks a temporal trend of normal data. Here, an example in which an autoencoder (Non-Patent Document 2) that learns using only the normal data is used as the anomaly detection algorithm, is described.

FIG. 3 illustrates a flowchart of an operation procedure of the model training apparatus 100 according to the fourth embodiment. In the fourth embodiment, in step S1, training data set X_train={x_train_1, x_train_2, . . . , x_train_T} and a model learned using the training data set are input from the input unit 101 and stored in the storage unit 102. Here, the model can be represented as a parameter set $\theta$, which is a set of parameters such as the weights and the biases of each layer of the autoencoder.

Next, in step S2, the test data x_test to be monitored and a threshold value $\gamma$ of the degree of the anomaly are input from the input unit 101 in a test phase. In step S3, the detector 103 calculates the degree of the anomaly of the test data as MSE (Non-Patent Document 2) using the model parameter $\theta$ stored in the storage unit 102 and the input test data x_test.

In step S4, the detector 103 compares the calculated degree of the anomaly with the threshold value $\gamma$. When the degree of the anomaly is equal to or greater than the threshold value, a detection result is set to "abnormal", and the x_test is stored in the storage unit 102 as abnormal data in step S5. When the degree of the anomaly is smaller than the threshold value, a detection result is set to "normal" and the x_test is stored in the storage unit 102 as normal data in step S6.

When the amount of the x_test stored in the storage unit 102 as the normal data reaches a predetermined amount T (YES in step S7), in step S8, the retraining unit 105 retrains the model parameter $\theta$ using x_test_1, x_test_2, . . . , x_test_T, and the past training data set X_train. As a method for retraining, for example, there is a method using a stochastic gradient descent method (see "Bottou, Léon. "Large-scale machine learning with stochastic gradient descent." Proceedings of COMPSTAT'2010. Physica-Verlag HD, 2010, 177-186") with considering that a set of the x_test_1, the x_test_2, . . . , the x_test_T, and the X_train is a new training data set and a gradient descent method that minimizes a function that should be minimized (here, the degree of the anomaly given as the MSE).

When the new training data is used, the x_test_1, the x_test_2, . . . , and the x_test_T may be duplicated to increase the amount of data in the training data set so that it is strongly learned that the x_test_1, the x_test_2, . . . , and the x_test_T are normal. Additionally, a method considering the importance of parameters that is similar to the third embodiment may be used. A parameter $\theta\_new$ obtained by the retraining is stored in the storage unit 102 as a new model parameter.

Fifth Embodiment

In the fifth embodiment, when over-detection that incorrectly determines that the normal data x_test is abnormal, occurs in the first embodiment or the third embodiment, the embodiment causes the model to re-learn that the x_test is normal.

Figure 4:
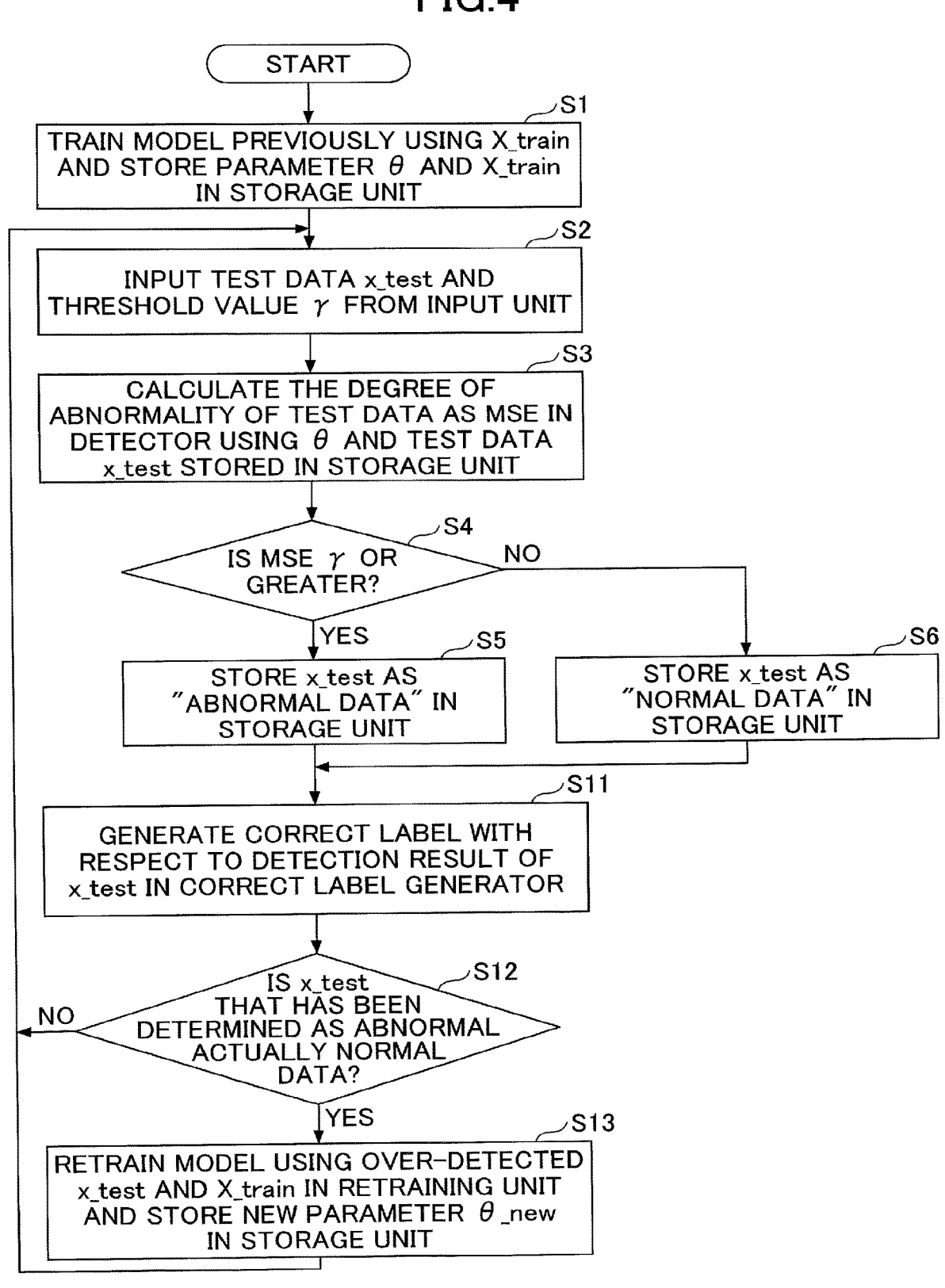
FIG. 4 is a flowchart for describing an operation of the model training apparatus 100 in a fifth embodiment.

FIG. 4 illustrates a flowchart of the fifth embodiment. In an example illustrated in FIG. 4, the operations of S1 to S6 are the same as the operations of S1 to S6 of the fourth embodiment (FIG. 3).

In the fifth embodiment, when the detector 103 detects that the x_test is normal or abnormal, in step S11, the correct label generator 104 generates a correct label indicating whether each data input in the past is normal. A method of generating a correct label is not limited to a specific method, and examples are as follows.

For example, as a method of generating a correct label, there is a method that determines data is "normal" when the data has been obtained in a normal operation and determines the data is abnormal when a predetermined special operation has been performed, based on a log generated from an object to be monitored. Other methods include a method inputting a result determined by another monitoring system that is operated in parallel, a method generating a label based on a report indicating the anomaly from a user currently using a system, and a method inputting a result visually determined by a system operator.

In step S12, the retraining unit 105 compares the data (x_test) determined to be abnormal with a correct label. As a result of the comparison, when the determination is correct, the retraining unit 105 does not perform the retraining. However, when the determination is incorrect, that is, when the anomaly detection has determined the x_test is abnormal although the correct answer label indicates that the x_test is "normal", the retraining unit 105 causes the model to re-learn that the x_test is normal and stores the new parameter θ_new in the storage unit 102 in step S13.

Here, for example, when a case of anomaly detection using an autoencoder in a manner similar to the first embodiment, is assumed, the retraining unit 105 performs retraining such that the degree of the anomaly given by the model $f(x\_test, \theta)$ is smaller than the threshold value γ. As a method of the retraining, there is a method of using the x_test and the X_train as in the first embodiment and a method of repeating the retraining in consideration of the importance of parameters as in the third embodiment until $f(x\_test, \theta)$ becomes smaller than the threshold value γ.

Sixth Embodiment

Figure 5:
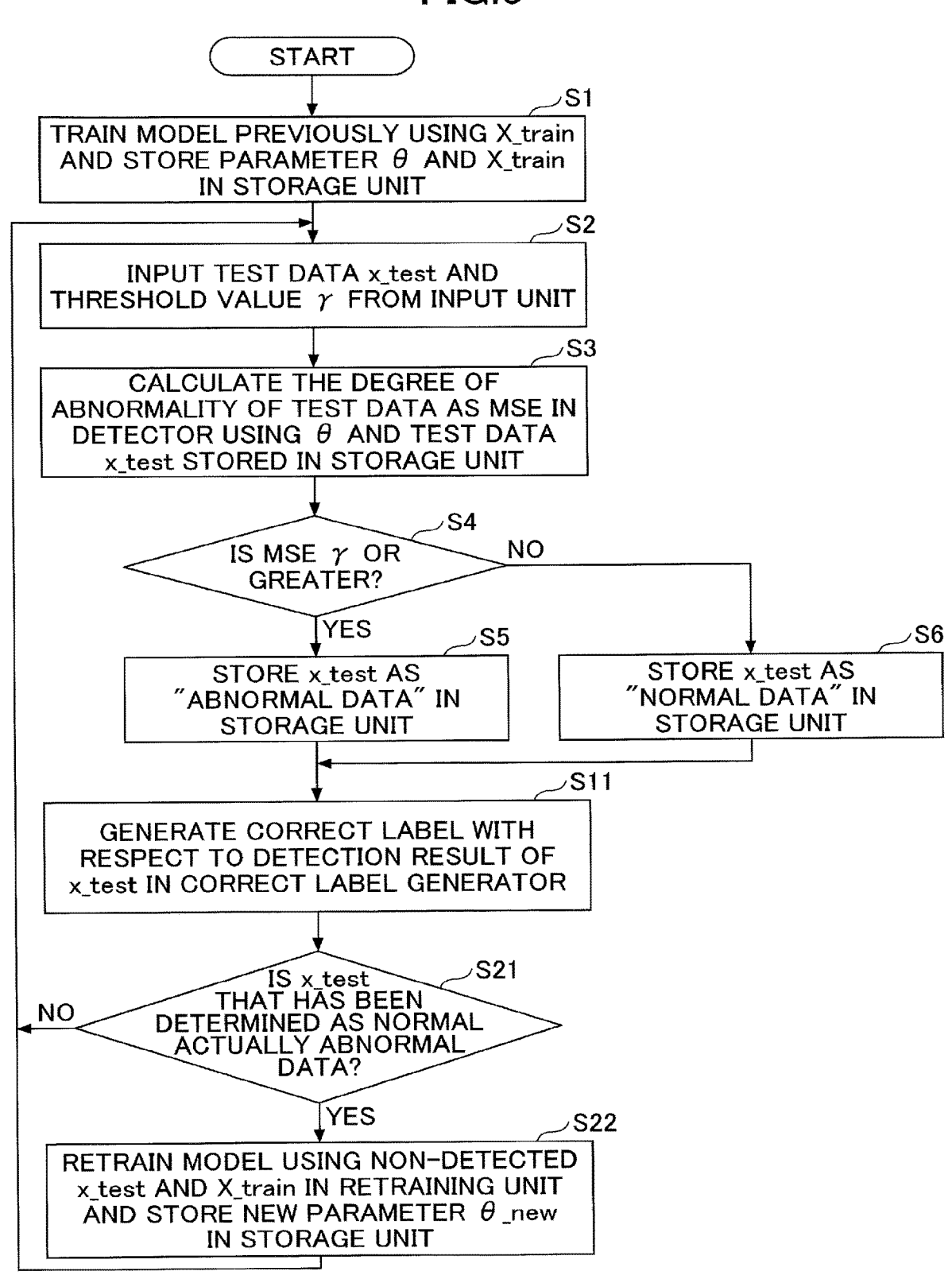
FIG. 5 is a flowchart for describing an operation of the model training apparatus 100 in a sixth embodiment.

In the sixth embodiment, when non-detection that incorrectly determines the abnormal data x_test is normal occurs in the first embodiment or the third embodiment, the embodiment causes the model to re-learn that the x_test is abnormal. FIG. 5 illustrates a flowchart of the sixth embodiment.

In FIG. 5, steps S1 to S11 are similar to steps S1 to S11 in the fifth embodiment (FIG. 4). When a detection result of the x_test is "normal" and a correct label generated by the correct label generator 104 indicates that the x_test is "abnormal" (YES in S21), the retraining unit 105 performs retraining such that the degree of the anomaly given by the model $f(x\_test, \theta)$ is equal to or greater than the threshold value γ. A method of the retraining can be easily achieved by changing the sign of a value of the evaluation function in learning an algorithm, in the retraining of the fifth embodiment. For example, when the autoencoder described in the third embodiment is used for an algorithm, the retraining can be performed by solving a problem of minimizing $-L(x)=-(1/N)\Sigma\_i=1^N (x\_i-x'\_i)^2$.

Seventh Embodiment

In the seventh embodiment, when a result of classifying the test data in the past can be considered to be correct in the second embodiment or the third embodiment, an anomaly detection tracking a temporal trend of the data is performed with retraining the model using the past test data in which the result of the classification is considered to be a label, as new training data. Models of classification include, for example, a multilayered neural network in which an output layer has as many nodes as the number of classes, but are not limited to this.

FIG. 6 illustrates a flowchart of the seventh embodiment. First, in step S31, the training data set X_train={x_train_1, x_train_2, . . . , x_train_T}, the label data Y_train={y_train_1, y_train_2, . . . , y_train_T} including a label of a class to which each element of the training data set X_train belongs, and the model trained by the training data set are input as the parameter θ and stored in the storage unit 102.

In the test phase, in step S32, the test data x_test to be monitored is input from the input unit 101. In step S33, the detector 103 estimates a class to which the test data belongs using the model parameter θ stored in the storage unit 102 and the input test data x_test, and stores the estimated class and the test data in the storage unit 102.

In step S34, the detector 103 determines whether the test data is normal or abnormal based on the estimated class and previously given information related to "normal" or "abnormal" of each class, and, in step S35 or step S36, the detector 103 stores a determined result in the storage unit 102.

When the amount of pairs of the x_test and estimated class y_test stored in the storage unit 102 reaches a predetermined amount T (YES in step S37), the retraining unit 105 retrains the model parameter θ using x_test_1, x_test_2, . . . , x_test_T, and the estimated class y_test_1, y_test_2, . . . , y_test_T, the X_train, and the Y_train in step S38. Alternatively, a method considering the importance of parameters as in the third embodiment may be used. In the fourth embodiment, as training is performed using only normal data, only data determined to be normal is stored for the retraining. However, in the seventh embodiment, as supervised learning is performed using label information, data determined to be abnormal is also stored in the storage unit 102 to be used for the retraining.

Eighth Embodiment

In the eighth embodiment, when class classification performed by the detector 103 is determined to be incorrect in the second embodiment or the third embodiment, new parameter θ new is retrained so that the x_test is correctly classified. A basic processing flow of the eighth embodiment is similar to the seventh embodiment (FIG. 6). However, as described below, the eighth embodiment is different from the seventh embodiment in that it is determined whether retraining is performed, based on a comparison of a correct label and a determined result.

In the eighth embodiment, as in step S33 of the seventh embodiment (FIG. 6), the detector 103 estimates class classification of the x_test. Subsequently, the correct label generator 104 generates a correct label related to a class to which each data input in the past belongs.

As a method of generating a correct label, for example, there is a method of classifying data into classes to which respective data belong from a log at times of obtaining respective data based on a correspondence relation between a log and each class, which is predetermined based on the log generated from an object to be monitored. Other methods include a method of inputting a result classified by another classification system operating in parallel, a method of generating a result based on a report from a user currently using a system (for example, classifying the quality in use into "high", "medium", and "low", and receiving feedback on a result of classifying the quality from the user), and a method of inputting a result visually determined by a system operator.

The retraining unit 105 compares a result determined by the detector 103 with the correct label. When a comparison result is correct, the retraining is not performed. When a comparison result is incorrect, that is, when a class provided by the correct label is different from the estimated class, the retraining unit 105 retrains the model that a class to which the x_test belongs is the actual input class y*_test. Methods of the retraining include a method using x_test, y*_test, X_train, and Y_train as in the second embodiment, and a method repeating the retraining with considering the importance of parameters as in the third embodiment.

Ninth Embodiment

Figure 7:
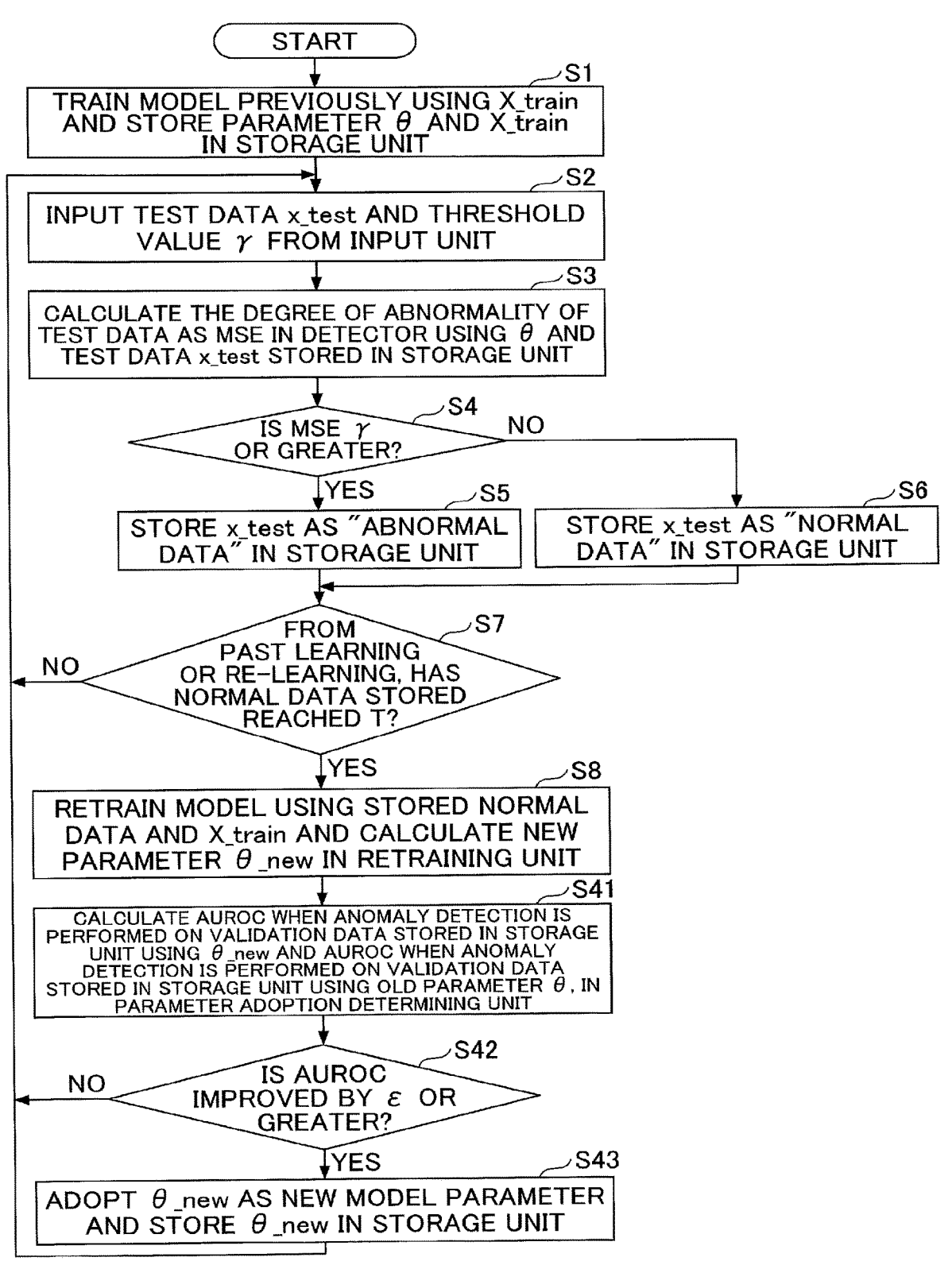
FIG. 7 is a flowchart for describing an operation of the model training apparatus 100 in a ninth embodiment.

In the ninth embodiment, it is determined whether to adopt a parameter obtained as a result of the retraining based on detection accuracy with respect to separately prepared validation data, in the retraining of the first to eighth embodiments. The ninth embodiment is applicable to all of the first to eighth embodiments, but as an example, a flowchart for determining adoption of a parameter obtained by the retraining of the fourth embodiment, is illustrated in FIG. 7. It is assumed that the validation data is already stored in the storage unit 102.

The operations of step S1 to step S8 in FIG. 7 are the same as the operations of step S1 to step S8 in the fourth embodiment (FIG. 3).

After the new parameter θ_new is obtained by the retraining unit 105, the parameter adoption determining unit 106 evaluates the accuracy of the model using the old parameter θ and the accuracy of the model using the new parameter θ_new, using the validation data X_valid={x_valid_1, x_valid_2, . . . , x_valid_M} and the label Y_valid={y_valid_1, y_valid_2, . . . , y_valid_M} of the validation data X_valid, which are stored in the storage unit 102, in step S41.

Here, with respect to the label, "normal" and "abnormal" are given in the fourth to sixth embodiments, and classes to be classified are given in the seventh and eighth embodiments. With respect to the accuracy, for example, Area Under Receiver Operating Characteristic (AUROC), which is an area on the lower side of a curve drawn when False Positive Rate is on the horizontal axis and True Positive Rate is on the vertical axis, can be used (see "Ikeda, Ishibashi, Nakano, Watanabe, Kawahara, Inferring causal parameters of anomalies detected by autoencoder using sparse optimization, Shingakukai IN Research Society, News & Technology Report, Vol. 117, no. 89, IN2017-18, pp. 61-66, June 2017").

The example illustrated in FIG. 7 uses the AUROC. When a metric indicating a higher value for better accuracy, such as the AUROC, is used, the new parameter θ_new is adopted for the parameter of the subsequent model in step S43 when the accuracy of the model using the new parameter is improved by ε or more compared with the accuracy of the model using the old parameter (YES in S42). Positive ε indicates that the new parameter is not adopted when the accuracy is not improved by a predetermined degree or more, and negative ε indicates that the new parameter is actively adopted even when the accuracy is reduced.

Tenth Embodiment

In the tenth embodiment, with respect to the test data x_test used when the retraining unit 105 performs retraining in the first to eighth embodiments, data that is too close to or too far from a subset of the past training data X_train is removed from data to be re-learned, thereby preventing overlearning and inappropriate learning. For example, when retraining is performed using test data determined to be normal in the fourth embodiment, a difference between test data close to the past training data set X_train={x_train_1, x_train_2, . . . , x_train_T} and the past training data is small, and retraining using the test data close to the past training data may cause overlearning to generate a model that is too fitted to the past training data.

Therefore, in the tenth embodiment, the parameter adoption determining unit 106 calculates a distance d(x_test, X_train) of the test data with respect to the X_train, and does not use test data whose distance is less than or equal to a threshold value for retraining. The determination in the tenth embodiment may be performed by the retraining unit 105. This is expected to prevent overlearning. With respect to the distance function d(x_test, X_train), for example, the Euclidean distance between the centroid x*_train of the X_train and the x_test may be considered; however not only the simple Euclidean distance, but also the Euclidean distance on a low-dimensional space to which the x_test and the x*_train are mapped using the t-SNE, for example, may be used (see "Maaten, Laurens van der, and Geoffrey Hinton. "Visualizing data using t-SNE." Journal of Machine Learning Research 9. November (2008): 2579-2605.").

Additionally, when the degree of the anomaly calculated with the anomaly detection model with respect to data x, is G(x), a distance between a distribution of G(x_train_i), i=1, . . . , and T, and G(x_test) (e.g., a difference between G(x_test) and an average value of G(x_train_i), i=1, . . . , and T) can be considered as d(x_test, X_train).

When retraining is performed using normal test data that is over-detected and determined to be abnormal in the fifth embodiment, if the x_test is too far from the x_train, a tendency of the model is changed too much due to retraining by using even the normal test data, and there is concern that the accuracy may be reduced by retraining. Therefore, it is expected that reducing the accuracy with retraining is prevented by not using the test data whose distance from X_train is greater than or equal to a threshold for retraining. Additionally, with respect to retraining for over-detection, by using a distance from an entire data that has been previously over-detected as an index instead of a distance from the X_train, data close to the data that has been over-detected in the past may be used for retraining.

In a case of a model in which multiclass classification is performed, for example, when retraining is performed using the test data correctly classified in the seventh embodiment and test data x_test is classified as a class c for example, it can be considered to determine whether the test data x_test is used for retraining based on a distance from the centroid of an entire training data having a label indicating y_train=c. Similarly, in the eighth embodiment, a method that determines that the x_test, with respect to allowing to be correctly re-learned as the class c, is re-learned only when a distance from the centroid of an entire training data that satisfies y_train=c, is smaller than or equal to a threshold, can be used.

Eleventh Embodiment

In the eleventh embodiment, a neural network is used as a model for learning in the first to tenth embodiments. In the first embodiment and variations of the first embodiment, for example, the autoencoder (Non-Patent Document 2) is provided as a neural network for detecting an anomaly as unsupervised learning. In the second embodiment and variations of the second embodiment, for example, a neural network described in "Manikopoulos, Constantine, and Symeon Papavassiliou. "Network intrusion and fault detection: a statistical anomaly approach." IEEE Communications Magazine 40.10 (2002): 76-82." is provided as a neural network for detecting an anomaly as supervised learning.

Effects

In an anomaly detection algorithm based on a trained model for determining whether input data is abnormal, the technique of the present disclosure described using the embodiments enables the model to be retrained so as to cause the model to follow a data trend or to prevent repeating a wrong determination.

A result of re-learning a normal data trend actually by using the fourth embodiment and the fifth embodiment was evaluated by using NSL-KDD ("Tavallaee, Mahbod, et al. "A detailed analysis of the KDD CUP 99 data set." Computational Intelligence for Security and Defense Applications, 2009. CISDA 2009. IEEE Symposium on. IEEE, 2009."), which is a representative benchmark for a network, and an evaluation result will be described in the following.

The benchmark includes data related to normal communication and data related to abnormal communication. In this evaluation, 67344 pieces of data of only normal communication extracted from all data were sorted in ascending order by "src_bytes", which is a feature quantity indicating the transmission quantity from a transmitter. The first 10000 pieces of data were used as training data and the latter 57344 pieces of data were used as test data. Therefore, the test data has a trend of an increase in the src_bytes compared with the training data. As a learning algorithm, the autoencoder (Non-Patent Document 2) that can be trained using only normal data was used. First, FIG. 8 illustrates a graph of the degree of the anomaly output from the autoencoder when the autoencoder was not retrained. Here, the horizontal axis indicates a test data ID, the vertical axis indicates the degree of the anomaly of the autoencoder, the solid line indicates the degree of the anomaly output from the retrained model, and the dotted line indicates a threshold. The threshold is given by an average+5×standard deviation where the average and the standard deviation are an average and standard deviation of the distribution of the degree of the anomaly when the training data is input to the retrained model.

As illustrated in FIG. 8, the degree of the anomaly exceeds the threshold and continues to rise from a point just before test data ID 20000. It can be considered that this is because the src_bytes continues to increase.

Next, FIG. 9 illustrates a result of following the data trend by periodically re-learning data determined to be normal by using the fourth embodiment. Here, the test data is input in order from ID 10000, and when the degree of the anomaly falls below the threshold, the data is stored as normal data. When the stored data accumulates to 500, the stored data is added to the past training data and retraining is performed. When the amount of the training data exceeds 40000, old data is deleted when new training data is added. When the training data is updated, the threshold value is also updated using the training data. When the retraining is not performed (FIG. 8), all data at ID 20000 and later exceeds the threshold, and is over-detected as an anomaly. However, as illustrated in FIG. 9, data that can be determined to be normal is increased by re-learning an upward trend of the src_bytes.

Figures 10, 11:
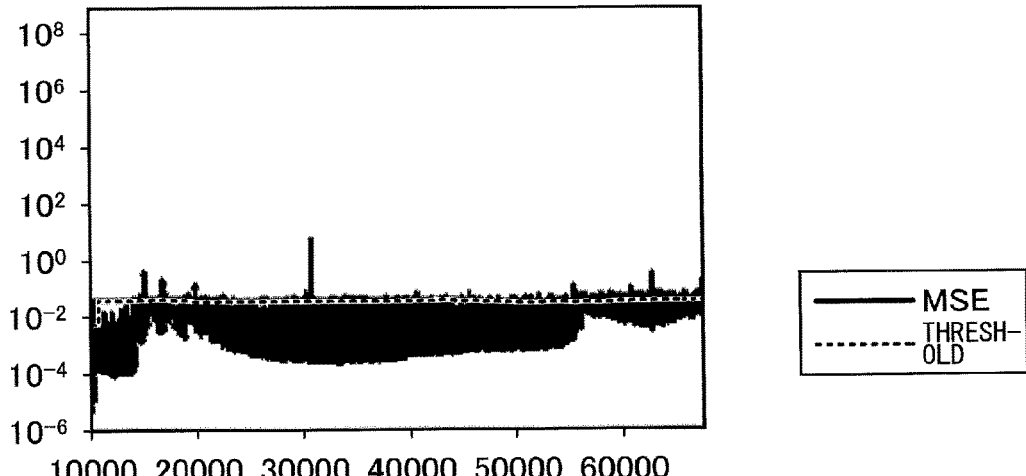
FIG. 10 is a graph indicating a change in the degree of the anomaly when a trend is tracked and over-detection is re-learned using the fourth embodiment and the fifth embodiment.
FIG. 11 is a result of comparing the number of over-detections in each evaluation.

Further, FIG. 10 illustrates a result of retraining when over-detection occurred so that similar over-detection would not occur while the model followed a data trend by combining the fourth embodiment and the fifth embodiment. Here, in the retraining method of the fifth embodiment, in a manner similar to the third embodiment, a method in which a penalty term weighted by the amount of Fisher information calculated by using past training data is added, is used, and retraining is performed using only over-detected data. Compared to the case illustrated in FIG. 9, in which over-detection frequently occurs even when the trend is learned, it can be observed that the over-detection is significantly reduced in FIG. 10. FIG. 11 illustrates a comparison of the number of over-detection occurrences. FIG. 11 indicates that it is possible to significantly reduce over-detection by only re-learning a trend, but by further combining the over-detection re-learning of the fifth embodiment, the number of over-detections can be reduced to less than 1% of the original number of over-detections.

Summary of Embodiments

As described above, in the first embodiment, for anomaly detection that calculates the degree of the anomaly of monitored data x represented by a numerical vector using the model $f(x, \theta)$, the parameter $\theta$ of the model $f(x, \theta)$ is trained in advance using the training data x_train, which is previously known to be normal. The model training apparatus 100 determines whether the test data x_test to be monitored is abnormal based on the output of $f(x\_test, \theta)$ and stores the training data, the test data monitored in the past, and a result of determining whether the anomaly is present in the test data monitored in the past based on the model, in the storage unit 102. The retraining unit 105 retrains the model $f(x, \theta)$ based on the result of determining whether each data is abnormal and a correct label separately given from the outside indicating whether the data is abnormal, and obtains a new parameter $\theta\_new$.

In the second embodiment, the model training apparatus 100 performs the anomaly detection for determining whether the monitored data x represented by the numerical vector is normal or abnormal based on a result of multiclass classification. In the second embodiment, the parameter $\theta$ of the model $f(x, \theta)$ is trained using the training data x_train in which a class to which each element of the training data belongs is given in advance as the label y_train. The model training apparatus 100 determines a class to which the test data x_test belongs based on the output of $f(x\_test, \theta)$ with respect to the test data x_test to be monitored, determines whether the test data x_test is abnormal based on the determined class, and stores the training data, the test data monitored in the past, and a result of classification based on the model, in the storage unit 102. The retraining unit 105 uses data based on the result of classification of each data and the correct label that is separately given from the outside and indicates a class to which the data belongs, for retraining the model $f(x, \theta)$, and obtains the new parameter $\theta\_new$.

In the first embodiment or the second embodiment, the model training apparatus 100 stores the degree of importance F of parameters learned in the past with respect to the training data, in the storage unit 102. In the third embodiment, at the time of retraining by the retraining unit 105, a new parameter $\theta\_new$ is trained while a parameter having the large degree of importance F is prevented from changing as much as possible.

In the fourth embodiment, when monitored data has a temporal trend, and the test data determined to be normal is stored in the storage unit 102 to a predetermined amount in the first or third embodiment, the model training apparatus 100 retrains the model f(x, θ) using the test data determined to be normal or past training data, and trains a new parameter θ_new to follow a temporal trend of the data.

In the fifth embodiment, when over-detection determining that normal data x_test is abnormal occurs in the first or third embodiment, the model training apparatus 100 prevents similar over-detection by training a new parameter θ_new that causes the model to correctly determine over-detected data x_test is normal when the over-detected data x_test is input.

In the sixth embodiment, when non-detection determining that abnormal data x_test is normal occurs in the first or third embodiment, the model training apparatus 100 prevents similar non-detection by training a new parameter θ_new that causes the model to correctly determine non-detected data x_test is abnormal when the non-detected data x_test is input.

In the seventh embodiment, when monitored data has a temporal trend, for example, and correctly classified test data is stored in the storage unit 102 to a predetermined amount in the second or third embodiment, the model training apparatus 100 retrains the model f(x, θ) using the classified test data and classified classes, or the past training data and labels, and trains a new parameter θ_new in the retraining unit 105, to follow the temporal trend of the data.

In the eighth embodiment, when incorrect class classification is performed on test data X_test in the second or third embodiment, the model training apparatus 100 prevents similar incorrect class classification by training a new parameter θ_new that causes the model to classify the test data x_test as a correct class when the test data x_test is input.

It is assumed that there is validation data in which a correct answer of being normal or abnormal, or a correct answer of class classification is known in advance, and the validation data is stored in the storage unit 102 in the first to eighth embodiments. In the ninth embodiment, after the retraining unit 105 obtains a new parameter θ_new, when classification accuracy of the validation data achieved by the model using the new parameter θ_new is not improved by the predetermined threshold value ε or greater compared with classification accuracy achieved by the model using the parameter θ, the parameter adoption determining unit 106 does not update the parameter and continues to use the parameter θ as a parameter of the model.

In the tenth embodiment, when retraining is performed using the past test data x_test in the first to eighth embodiments, the parameter adoption determining unit 106 updates the parameter only when the function d(x_test, X_train) indicating a distance of the x_test with respect to the past training data X_train={x_train_1, . . . , x_train_T} satisfies a predetermined condition, thereby preventing the degradation of the accuracy caused by overlearning by re-learning data that is too close to a tendency of the past training data or caused by re-learning data that is extremely different from a tendency of the past training data.

In the eleventh embodiment, the model training apparatus 100 in the first to tenth embodiments, performs training using a neural network in the retraining unit 105.

As described above, the embodiment of the present invention provides a model training apparatus including a storage unit that stores a parameter of a model trained by using training data, and the training data, a detector that uses the model to determine whether an anomaly is present in test data set and stores a determined result and the test data set in the storage unit, and a retraining unit that retrains the model by using the determined result, the test data set, and the training data set.

The detector may use the model to determine a class of each of the test data and may determine whether the anomaly is present in the test data based on the determined class.

The retraining unit may use the degree of importance of a parameter with respect to the training data to limit the amount of change in the parameter in accordance with the degree of importance in retraining.

The retraining unit may retrain the model using a correct answer related to whether the anomaly is present in the test data set so that the test data that has been incorrectly determined is correctly determined.

The model training apparatus may further include a parameter adoption determining unit that determines whether to adopt a new parameter of the model to be used by the detector based on accuracy of anomaly detection performed with respect to validation data by using the new parameter after the retraining unit has obtained the new parameter.

The retraining unit may determine whether to use the test data for retraining based on a distance of the test data with respect to the training data set.

An example embodiment of the invention has been described in detail above, but the invention is not limited to the described embodiment. Various modifications or alterations can be made within the scope of the invention as recited in the claims.

This international application is based on and claims priority to Japanese Patent Application No. 2018-001485, filed Jan. 9, 2018, the entire contents of which are incorporated herein by reference.

LIST OF REFERENCE SYMBOLS

100 model training apparatus
101 input unit
102 storage unit
103 detector
104 correct label generator
105 retraining unit
106 parameter adoption determining unit
150 drive device
151 recording medium
152 auxiliary storage device
153 memory device
154 CPU
155 interface device
156 display device
157 input device

The invention claimed is:

1. An apparatus for training a model comprising:
a processor; and
a memory storing program instructions that cause the processor to:
store a parameter of the model trained by using a training data set, and the training data set;
receive data from a network;
obtain an output from the model to determine whether an anomaly in the network is present in a test data set based on the obtained output and store a determined result and the test data set;
retrain the model by using the determined result, the test data set, and the training data set; and

subsequently receive data from the network, and obtain an output from the retrained model to determine whether an anomaly in the network is present in the subsequently received data in real-time, wherein the processor retrains the model by using an element of the test data set in response to determining that the element of the test data set is incorrectly determined as the anomaly and determining that a distance of the element of the test data set with respect to the training data set is less than a threshold to prevent overlearning.

2. The apparatus for training the model as claimed in claim 1, wherein the processor uses the model to determine a class of each element of the test data set, and the processor determines whether the anomaly is present in the test data set based on the determined class.

3. The apparatus for training the model as claimed in claim 1, wherein the processor retrains the model by using a correct answer related to whether the anomaly is present in the test data set so that an element of the test data set that has been incorrectly determined is correctly determined.

4. The apparatus for training the model as claimed in claim 1, wherein the processor is configured to determine whether to adopt a new parameter of the model to be used by the processor based on accuracy of anomaly detection performed with respect to validation data by using the new parameter after the processor has obtained the new parameter.

5. The apparatus for training the model as claimed in claim 1, wherein the data received from the network includes network traffic data.

6. The apparatus for training the model as claimed in claim 1, wherein the output from the model is obtained to determine whether the anomaly in a temporal trend of an increase or decrease in a particular type of data in the network is present in the test data set.

7. The apparatus for training the model as claimed in claim 1, wherein the distance is a Euclidean distance on a low-dimensional space to which the test data set and the training data set are mapped.

8. A model training method comprising:

receiving data from a network;

obtaining an output from a model to determine whether an anomaly in the network is present in a test data set based on the obtained output and storing a determined result and the test data set, the model being trained by using a training data set;

retraining the model by using the determined result, the test data set, and the training data set;

f subsequently receiving data from the network, and obtain an output from the retrained model to determine whether an anomaly in the network is present in the subsequently received data in real-time, wherein the retraining of the model includes retraining the model by using an element of the test data set in response to determining that the element of the test data set is incorrectly determined as the anomaly and determining that a distance of the element of the test data set with respect to the training data set is less than a threshold to prevent overlearning.

9. A non-transitory computer-readable recording medium having a program for causing a computer to perform a process comprising:

receiving data from a network;

obtaining an output from a model to determine whether an anomaly in the network is present in a test data set based on the obtained output and storing a determined result and the test data set, the model being trained by using a training data set;

retraining the model by using the determined result, the test data set, and the training data set;

f subsequently receiving data from the network, and obtain an output from the retrained model to determine whether an anomaly in the network is present in the subsequently received data in real-time, wherein the retraining of the model includes retraining the model by using an element of the test data set in response to determining that the element of the test data set is incorrectly determined as the anomaly and determining that a distance of the element of the test data set with respect to the training data set is less than a threshold to prevent overlearning.

* * * * *